Oct. 6, 1959
E. CHAPMAN
2,907,648
METHOD OF VAPORIZING A FUEL
Filed Sept. 30, 1955
5 Sheets-Sheet 1
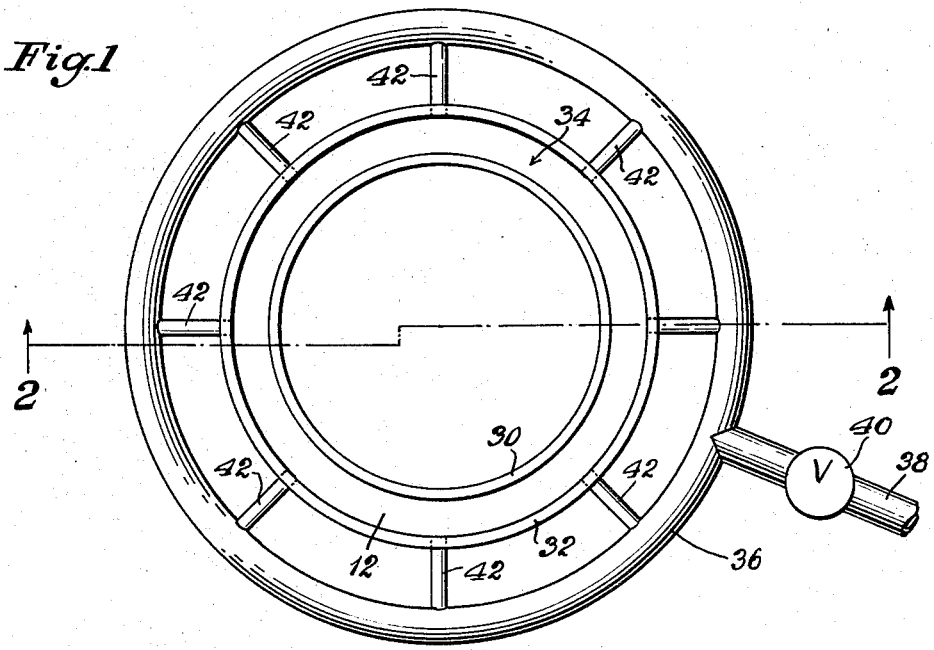
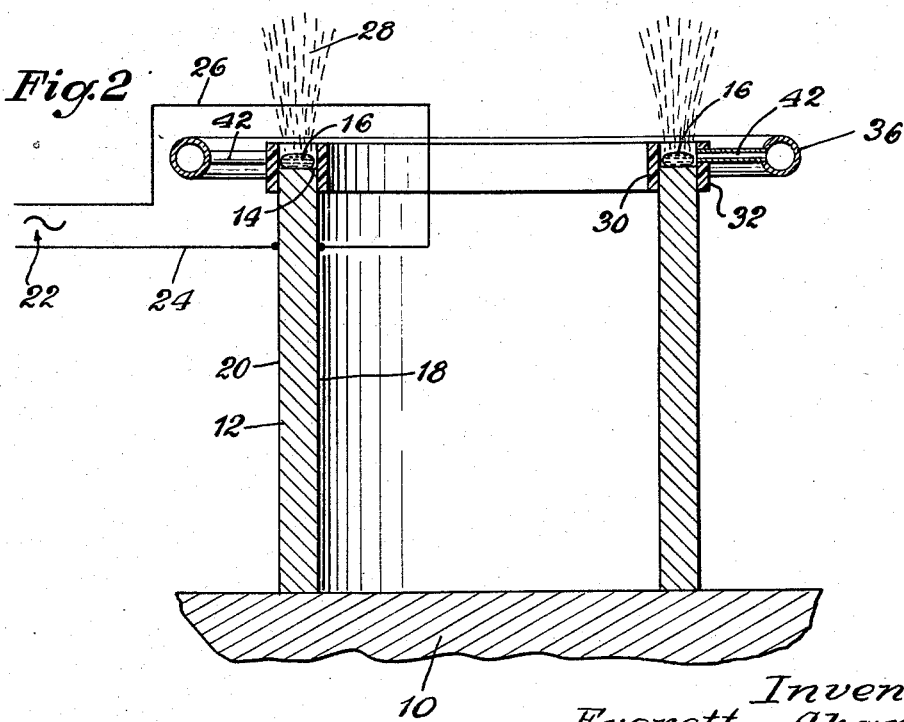
Inventor
Everett Chapman
by Parker & Carter
Attorneys Oct. 6, 1959                E. CHAPMAN                2,907,648
                    METHOD OF VAPORIZING A FUEL
Filed Sept. 30, 1955                              5 Sheets-Sheet 2

Inventor
Everett Chapman
by Parker & Carter
Attorneys

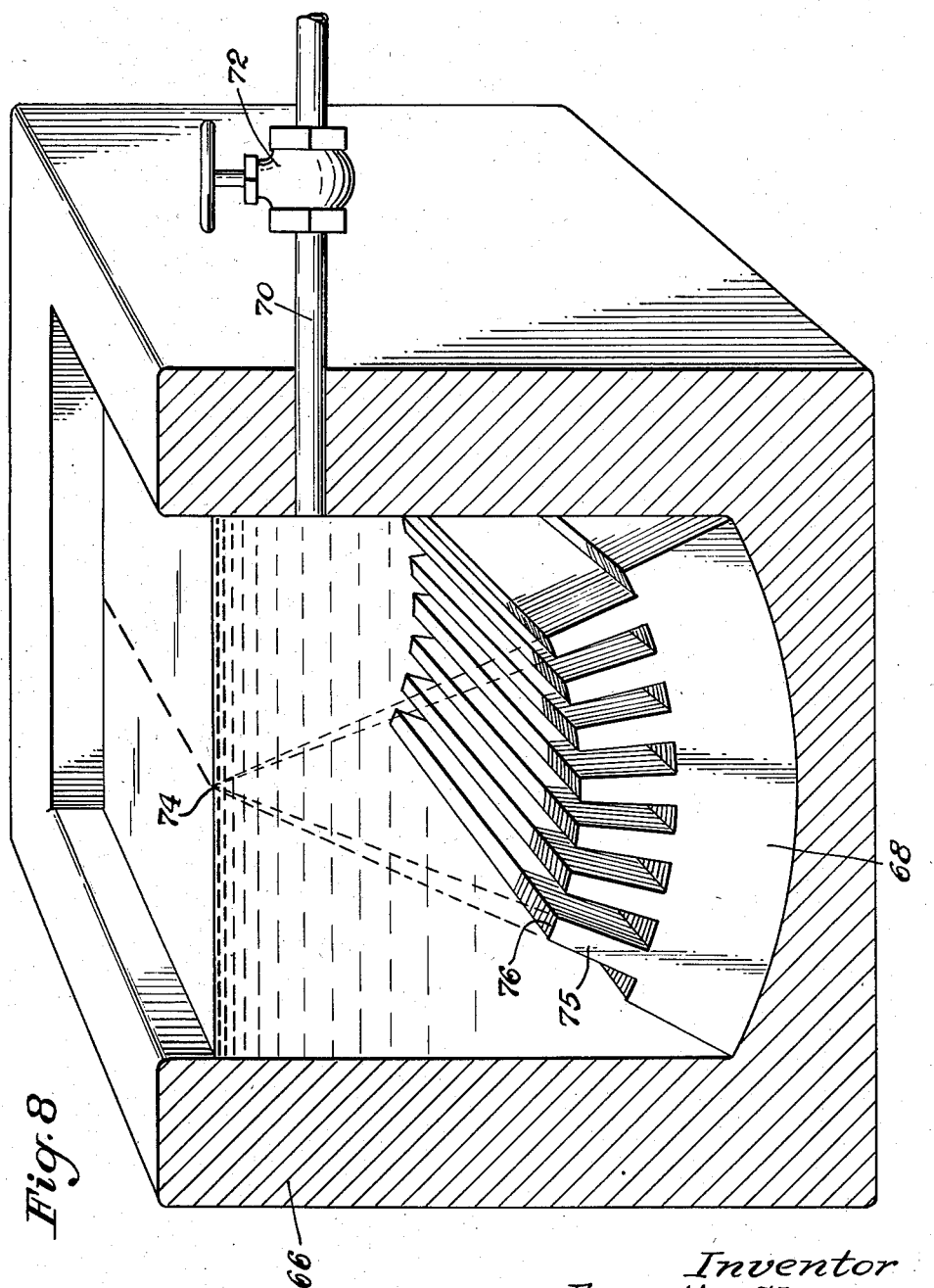

Oct. 6, 1959

E. CHAPMAN 2,907,648

METHOD OF VAPORIZING A FUEL

Filed Sept. 30, 1955

Inventor
Everett Chapman by Parker & Carter
Attorneys

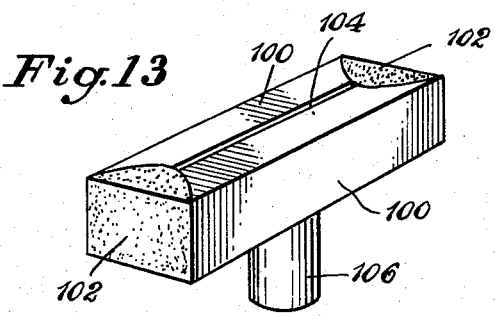
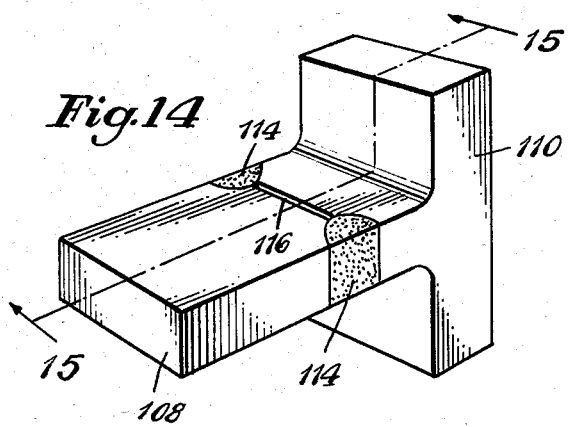
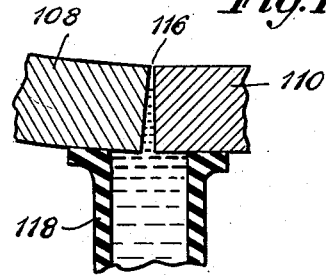
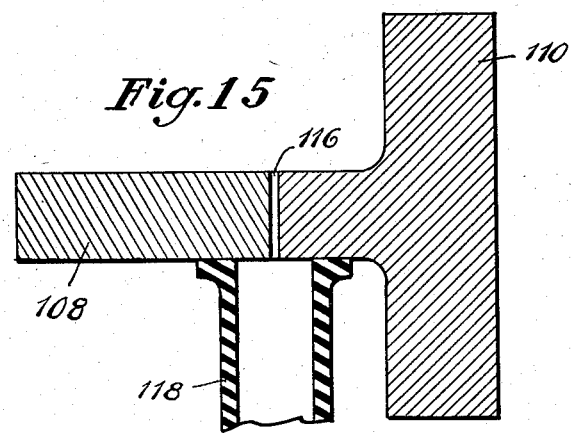
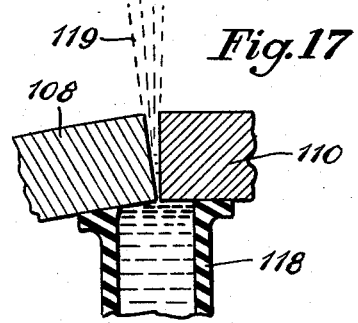

United States Patent Office 2,907,648
Patented Oct. 6, 1959

2,907,648
METHOD OF VAPORIZING A FUEL

Everett Chapman, West Chester, Pa., assignor to Nordberg Manufacturing Company, Milwaukee, Wis., a corporation of Wisconsin Application September 30, 1955, Serial No. 537,625

12 Claims. (Cl. 48—219)

This invention resides in the field of methods and apparatus for vaporizing or atomizing a substance by the use of mechanical vibrations and is in the nature of a method and apparatus whereby a given liquid can be effectively atomized or dispersed as a fog or aerosol with a minimum energy.

A primary object of my invention is a new and improved method for vaporizing a liquid, for example a fuel, by placing the liquid in a zone of treatment and subjecting it to high acceleration forces by means of high frequency mechanical vibrations.

Another object is a new and improved method of vaporizing a selected fuel in a more efficient manner by the use of relatively high frequency mechanical vibrations.

Another object is a method of vaporizing a selected fuel in a selected working zone and includes the step of coordinating or synchronizing the characteristics of particular fuel worked upon, the height of the column of fuel undergoing treatment, the natural frequency of the work piece used to impart mechanical vibration to the fuel, the frequency of the medium used to produce mechanical vibration in the work piece, and the pressure and temperature in the space surrounding the working zone.

Another object is a method of atomizing or vaporizing fuel or the like in a more efficient manner by properly matching the mechanical impedances of the fuel column and the work piece.

Another object is a method of vaporizing fuel to form an air fuel mixture for an internal combustion engine or the like.

Another object is a new and improved apparatus for producing the desired mechanical vibrations for the above.

Another object is a mechanical vibration producer or driver which will supply the desired mechanical vibration at the desired frequency but is nevertheless made of inexpensive elements all of which can be obtained as standard items.

Another object is a method generally of the type in which optimum efficiency is obtained by matching the mechanical impedance of the vibrating work piece, called the driver, and the electrical impedance of the source of energy.

Another object is a new and improved transducer characterized by high mechanical accelerations per square inch of exposed work area and optimum configuration with maximum work area.

Another object is a new and improved method of vaporizing a liquid fuel in a working zone between a pair of driver elements, at least one of which is subjected to ultrasonic vibration to produce a violent squirting or pumping action.

Another object is a method of vaporizing fuel for an internal combustion engine by a driver element with its transverse mode an harmonic of its longitudinal mode and arranged so that when the driver element generates mechanical vibration at its resonant or fundamental frequency, standing waves of fuel are produced on the surface of the element and the crest of the waves are atomized by an harmonic vibration on the transverse mode.

Another object is a method of vaporizing a fuel by a driver element in which the element is subjected to two frequencies, one being the resonant or natural elastic frequency of the longitudinal mode while the other is the resonant frequency of the transverse mode.

Another object is a method of vaporizing a fuel by simultaneously vibrating an elongated driver element on both its longitudinal and transverse modes at the resonant or natural elastic period of each so that standing waves set up on the element's longitudinal surface will be vaporized by the high amplitudes produced on the transverse mode, and the rate of fuel feed and frequency of vibration on the longitudinal mode are coordinated so that the impedance of the standing waves due to their height matches the transverse impedance of the driver element.

Another object is a method of the above type in which a catalytic agent is added to a heavy fuel to promote vaporization and dispersion as an aerosol.

Other objects will appear from time to time in the ensuing specification and drawings in which:

Figure 1 is a plan view of an apparatus for carrying out my basic concept;

Figure 2 is a section taken along line 2—2 of Figure 1;

Figure 8 is a perspective, partly in section, of a focusing driver;

Figure 13 is a perspective of another form of driver for effecting a squeezing or pumping action;

Figure 14 is a perspective of a variant driver similar to Figure 13;

Figure 15 is a section of Figure 14 taken along line 15—15;

Figure 16 is a view of the driver in Figures 14 and 15 in one position during operation; and Figure 17 is another view similar to Figure 16 showing a different position.

Figure 3:
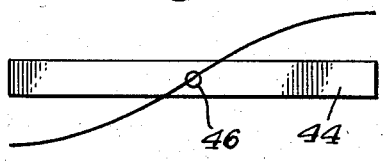
Figure 3 is a half wave bar driver.
Figure 4:
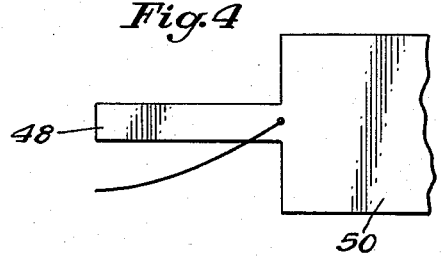
Figure 4 is a quarter wave bar driver.

In Figures 1 and 2, I have shown what can be considered any suitable base 10 supporting what I shall term a crystal, work piece, driver element, or stack 12. I have shown a cylindrical object positioned generally upright having selected inside and outside diameters, height, and wall thickness. The upper surface 14 of the crystal or stack can be generally horizontal and is in effect an annular working station or treatment zone. In this zone I position a selected mount of a suitable substance, indicated generally at 16, which I desire to atomize or vaporize in a manner to be set forth hereinbelow.

I desire to subject the substance 16 to mechanical vibrations at a predetermined frequency, and to do this both the inside and outside of the stack are provided with metallic covers or plates at 18 and 20 which function as electrodes and are connected to a source of current 22 by suitable leads 24 and 26. It should be understood that the invention is not necessarily limited to this particular driver mechanism because I have only shown it to set forth the fundamentals of the invention.

To carry out my invention the driver mechanism 12 has a predetermined frequency of vibration induced in it which is transmitted to the substance 16 in the working zone. In response to these vibrations the liquid, preferably a fuel, will form a vapor as at 28 in a moving air stream to form a vapor-air mixture to be used as the fuel supply for an internal combustion engine, an oil heater or the like.

Producing the desired frequency of mechanical vibration in the stack or driver can be accomplished in a number of ways.

A large number of materials exhibit what are termed electrostrictive and magnetostrictive characteristics. This is to say that a particular material will expand and contract at a rapid rate when subjected to an alternating voltage or a magnetic field. For example, if an alternating magnetic field is applied to nickel it constricts. When the field is released, the nickel expands. If a high frequency magnetic field is used, the nickel will vibrate rapidly. When the same magnetic field is applied to Permalloy, it exhibits the opposite characteristic by expanding when the field is applied and contracting when the field is released. This phenomena is termed magnetostrictive or the magnetostriction effect, and ferromagnetic materials other than nickel have this property. As an additional example I have found that a 49% nickel–51% iron alloy works quite effectively for this purpose, because it is 95% as active as pure nickel but generates only about 15% as much internal heat.

When a voltage is applied to a properly cut quartz crystal, for example, it constricts. When the voltage is released, it expands. This is termed electrostrictive or the electrostriction effect. Other well-known insulators exhibit these characteristics.

In the arrangement shown in Figure 2, for purposes of illustration, I have chosen an electrostrictive material for the crystal or stack and I subjected it to an alternating electric current produced by any suitable apparatus, for example, a valve generator.

Any quantity of the substance 16 positioned in the working zone will atomize when subjected to the mechanical accelerations of the crystal, however one of the important objects of my invention is to so relate the amount of the substance being worked upon to the characteristics of the crystal or stack and to the characteristics of the source of energy so that the substance will be vaporized very efficiently. To do this I match the mechanical impedance of the substance, with the mechanical impedance of the crystal or driver, and the electrical impedance of the source of energy to cause atomization at an optimum rate.

The impedance of a substance 16 is influenced by the pressure of the atomsphere above it opposing atomization, the temperature of this atmosphere which affects the viscosity of the liquid, and the height or thickness of the column of liquid positioned in the work zone. These same factors apply to the crystal or stack although atmospheric pressure is much less influential. Assuming for the moment that other factors can be held constant, my object is to vary the height of the column of substance in the working zone until the mechanical impedance of the substance matches the mechanical impedance of the driver or stack and the electrical impedance of the source of energy.

In Figure 2 I have shown a proposed set up which can be used for this purpose. Neoprene rings 30 and 32 have been secured around the top of the crystal to form an annular channel 34. A manifold 36 supplied with fuel from a suitable source through an inlet 38 having a suitable valve 40 communicates with this channel by a plurality of radial inlet tubes 42 which can be spaced in any suitable manner so that liquid is supplied to the working zone or station at a plurality of points. A suitable pump or other type of feeding means can be used to control the unit properly. The important point is that the fuel can be maintained in the working zone at a generally constant head or level which is selected so that the impedance of the driver element is matched to the impedance of the driven element.

It is also important to tune the natural resonant frequency of the crystal or driver to the frequency of the field, and as an example of this I have found that a five inch long bar of nickel has a natural longitudinal elastic frequency of 20,000 cycles per second, whereas a three inch bar of nickel has a resonant frequency of 33,000 cycles per second. Therefore on the five inch bar I apply a 20,000 cycles per second magnetic field which produces a resonant condition in the bar. Very large amplitudes can be built up in this manner. It should be borne in mind that the length of the work piece or crystal and the frequency of the alternating field applied to it are dependent upon the particular material selected for the work piece and I have only set forth nickel as an example.

But be this as it may, one important aspect of my invention is concerned with synchronizing the frequency of the magnetic field or voltage to the fundamental frequency of the crystal.

My example above was given for a magnetostrictive material, and the same type of tuning to produce maximum amplitudes may be used with an electrostrictive material by properly selecting its length and the frequency of the voltage applied to it.

I wish to emphasize that certain phases of my invention are not necessarily restricted to any particular material for the crystal, nor to any particular manner or apparatus for producing the mechanical vibrations, although certain aspects of an inventive nature are present in the particular driver element. It should also be borne in mind that the mechanical impedance of a liquid column is a function of frequency. To match them, the lower the frequency, the longer the column and vice versa. The main advantage of higher frequencies will be that the acceleration forces ripping the liquid apart and atomizing it go up as the square of the frequency.

The invention is not necessarily restricted to any particular frequency or range. However, frequencies above the audible range are definitely recommended for obvious reasons. For example, I have found that 20,000 cycles per second works quite well and is not uncomfortable to the operator.

The dimensions of the particular driver element are important because they influence its natural or fundamental frequency. In Figure 3 I have shown a bar 44 which is anchored at its center 46 and has an overall length so that it functions as a half wave length bar, the wave length being shown diagrammatically across it. When such a bar is vibrated longitudinally at its resonant frequency, high amplitudes can be built up on the ends of the bar. In Figure 4 I have shown a similar bar 48 having a rigid mounting or base 50 so that when the bar is vibrated at its resonant frequency, it functions as a quarter wave length bar, shown diagrammatically, and high amplitudes can also be built up on the end surface of the bar. In either case, if fuel were supplied to the ends of the bars, it would be atomized by the high accelerations. The side surfaces could be coated with a suitable metal and connected to a source of energy as in Figures 1 and 2.

It is important that the driver element convert as much of the energy as possible from the source into mechanical vibrations and not into heat. For example some metals will heat up rapidly due to eddy currents generated in them, and laminations can be resorted to reduce heating. In Figure 5 I have shown a laminated driver element having a common base 52 for a plurality of quarter wave length bars 54 made up of a plurality of laminations secured together in any suitable manner. Each quarter wave length bar would produce high amplitudes on its longitudinal mode, and fuel could be supplied to the end surfaces either by a suitable nozzle arrangement or by submerging the driver in a tank to a predetermined depth.

Figure 6:
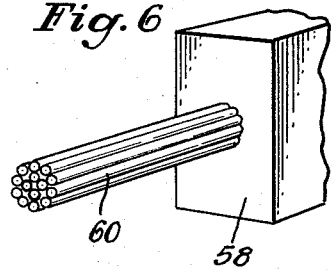
Figure 6 is a perspective of a bundle type quarter wave bar driver.

In Figure 6 I have shown another type of quarter wave length bar having a base or mounting 58 and a plurality of extended rods which form a bundle 60, and such a driver, when subjected to a frequency which would cause a resonant vibration on the longitudinal mode, would produce very high amplitudes and effective atomization at the outer ends of each rod as well as in the interstices between them due to a pumping or squeezing action.

Figure 5:
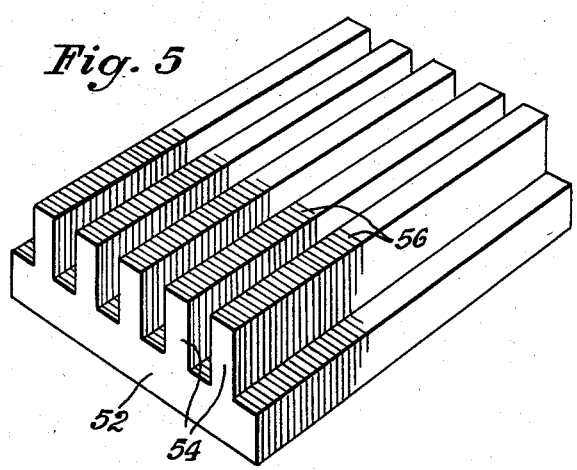
Figure 5 is a perspective view of a laminated, multiple quarter wave bar driver.
Figure 7:
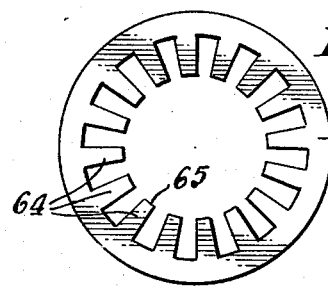
Figure 7 is a side view of a lamination for a cylindrical quarter wave bar driver.

In Figure 7 I have shown another driver element similar to Figure 5 except that the base of the quarter wave length bar has been formed into a circle 62 with each bar 64 having radial sides projecting inwardly toward a common center point. Figure 7 represents merely a lamination and a plurality of such laminations could be secured together to form a vertical cylinder of a suitable length similar to the cylinder of Figures 1 and 2 and fuel could flow down over the inner surface 65 of each bar.

In Figure 8 I have shown a suitable tank 66 with an arcuate driver element 68 having a suitable inlet line 70 for fuel and a control valve 72 of any suitable type. The driver element can be considered a segment of the Figure 7 element and each of the quarter wave length bars 75 is an integral part of the base and converges to a center or focal point 74 forming a focal line generally at the surface of the liquid in the tank. The distance from the end surfaces 76 of the bars to the focal line 74 has been exaggerated in the drawing for purposes of illustration, and it may be the height of a column of fuel having a mechanical impedance which will match the mechanical impedance of the driver and the electrical impedance of the source of energy. Thus the fuel at the focal line 74 will be subjected to the combined action of all of the quarter wave length bars which produces violent atomization, and additionally matching the impedance, which steps up atomization further. The driver has been submerged in the fuel tank so that any heat losses in the driver element due to eddy currents will be recovered in the fuel, and excess fuel could be piped out of the bottom of the tank and recycled through a suitable filter to prevent the collection of sludge in the grooves of the driver.

Figure 9:
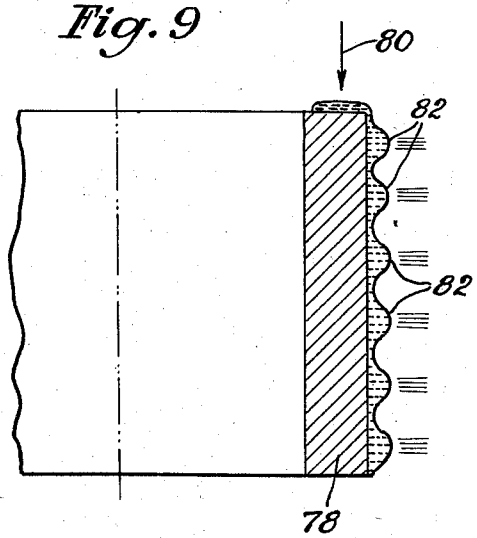
Figure 9 is a vertical section through a cylindrical driver element of a variant form.

In Figure 9 I have shown a driver element 78 in the form of a cylinder like Figure 1 with fuel being fed to the upper edge through a suitable nozzle, indicated by the arrow 80, in amounts such that the fuel will flow down the sides of the cylinder. I intend to apply two frequencies to the cylinder, one a resonant frequency of the crystal or stack in its longitudinal mode so that the crystal will set up standing waves around its surface, and the other a resonant frequency of the crystal in its radial mode so that the crystal will create maximum amplitudes on its radial mode to violently vaporize the fuel in each of the standing waves. I have shown six such standing waves 82, however more or less could be set up depending upon the frequency applied to the longitudinal mode. In any event the rate of fuel feed and the frequency for setting up the standing waves are related or selected so that the height or thickness of the fuel in the waves gives a mechanical impedance that will match the mechanical impedance of the driver element on its radial mode. Each standing wave in effect constitutes a separate jet or atomizer.

Figure 10:
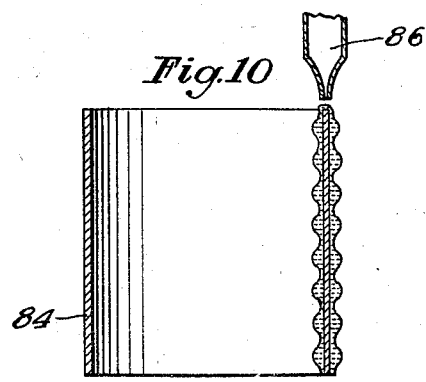
Figure 10 is a further variation similar to Figure 8.

In Figure 10 the cylinder 84 is thinner and the nozzle 86 emits fuel on the upper edge so that it flows down over both the inside and outside surfaces. The driver is vibrated on its longitudinal mode to set up the standing waves in the same manner as explained with reference to Figure 9 and the second frequency is applied so that each standing wave will be atomized violently with its impedance matched to the impedance of the crystal on the radial mode. I have only shown one nozzle 86, and a plurality could be used or a continuous cylindrical nozzle or trough could be used so that the fuel would float uniformly over the entire inner and outer surfaces.

Figure 11:
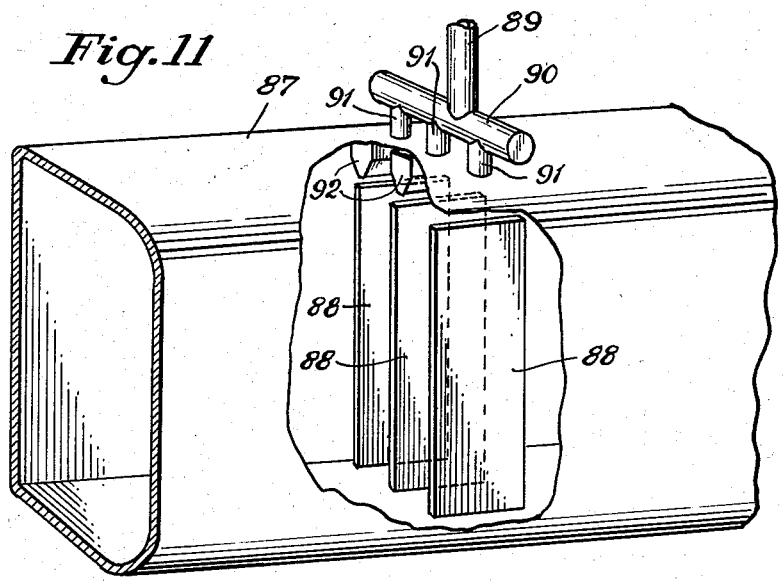
Figure 11 is a perspective, partly broken away, showing an atomizer and manifold.

In Figure 11, I have shown a section of a manifold 87 for an internal combustion engine which has a plurality of vertical slats 88 positioned across it disposed in the direction of air flow to prevent a restriction. A suitable fuel line 89 leads to a fuel manifold 90 having a plurality of nozzles 91, one for each slat, leading to a trough 92 having a plurality of openings so that fuel will be supplied to the top of each plate or slat at a uniform rate. The fuel will flow down both sides of the slats and each slat has two frequencies applied to it, one to produce a resonant vibration in the longitudinal mode so the standing waves in the fuel will be set up on each surface, and the other to produce a vibration in the radial or transverse mode so that the fuel in each of the standing waves will be violently atomized with matched impedances. The slats can be equally spaced and the air flow through the manifold will pick up the atomized fuel and form an air fuel mixture of the proper proportion or ratio which is carried to the engine for combustion purposes.

Figure 12:
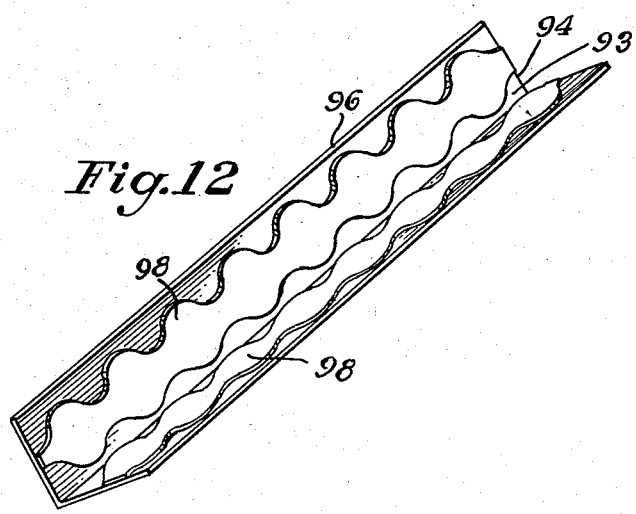
Figure 12 is a perspective of a variant form of driver.

In Figure 12, I have shown a V-shaped trough 93 having two side surfaces each of which is supplied with fuel, either along the upper edge 94 or along the side edges 96, depending upon whether the trough is positioned flat or turned on end. In each case the driver or trough has mechanical vibrations generated in it which produce a resonant condition on the longitudinal mode set up the standing wave indicated diagrammatically at 98 and at the same time resonant vibration on the radial mode kicks off or atomizes the fuel violently in each of the waves. The dimensions of the element are selected so that the radial mode is a harmonic of the longitudinal mode, and the selected frequency for the longitudinal mode is such that the height of the standing waves produce a mechanical impedance which matches the mechanical impedance of the driver on its radial mode and the electrical impedance of the source. Thus one frequency can be used to perform both the set up and the kick off.

In Figure 13 I have shown two driver elements 100 connected together at each end by suitable welds 102 but spaced from each other to provide a gap 104. A rubber pipe or the like 106 maintains a static head of fuel in the gap and the driver elements are subjected to mechanical vibrations on the longitudinal mode so that the gap or slot rapidly increases and decreases in width, in effect an opening or closing action, so that the fuel in the gap is pumped or squirted at the same time that it is subjected to the atomizing action of the mechanical accelerations.

In Figures 14 through 17 I have shown another form of driver or transducer which has a quarter wave length bar 108 connected to a foundation or base 110 through suitable welds 114 providing a gap 116 so that fuel can be fed upwardly by a suitable rubber tube or the like 118 to maintain a static head in the slot. When the driver is subjected to mechanical vibrations at a selected frequency to set up resonant vibrations on the radial mode, the end of the bar will cantilever to effect a squeezing action in the slot. In Figure 16 the bar has first bent upwardly to provide a capillary intake of fuel into the opening, and in Figure 17 the bar has cantilevered downwardly to squeeze a discharge of fuel upwardly at 119. This arrangement can be termed a rocking pump. Such a pumping action could be obtained between two driver elements such as in Figure 13 by having separate mountings for each element and only vibrating one of the elements on its longitudinal mode, the other element being stationary constituting an anvil with the vibrating element acting as a hammer.

The invention can be used to atomize all types of fuel, from the most viscous to the thickest gum, and I have found that a thicker fuel, for example, grade 6, can be atomized effectively by adding a small amount of grade 2 fuel which is far less viscous. Any other suitable catalytic agent which promotes vaporization could be used. In general a number of additives could be used for the thicker fuels which will materially step up their atomization.

One of the apparent uses for my invention is the atomization or vaporization of fuels for internal combustion engines. The degree of efficiency of vaporization of the fuel from the working zone is influenced by the environmental conditions, for example, the temperature and pressure of the air surrounding or moving past the working zone. In the case of an internal combustion engine manifold it will definitely influence the degree of vaporization and will affect the condition of the air-oil interface as far as its reaction to the high frequency accelerations is concerned. In a supercharged engine the vaporizer could be put either ahead of or behind the supercharger and intercooler or between them depending upon whether low pressures or high pressures or high temperatures are the most effective with the unit.

While I have shown and described the preferred form and several modifications of my invention, other substitutions and changes can be made without departing from the invention's fundamental theme. For example, a number of materials could be used, for example barium titanate makes an excellent vibrator or crystal. I also mentioned that nickel, a nickel alloy, silicon iron or one or more of the new sintered ferrites will also work. The metal selected should not heat excessively because its magnetostriction effect will decrease as its temperature rises, and its curie point should also be high. A composite driver, partly an insulator or nonferromagnetic material might be used to reduce the eddy current losses to a minimum.

The vibrators or drivers in Figures 3-12 are intended to be electrostrictive and their surfaces would be coated with a suitable metal and connected by suitable leads to a source of energy. It should also be understood that the drivers could be magnetrostrictive.

I claim:

1. A method of vaporizing a selected fuel, including the steps of positioning a column of such fuel in a working zone adjacent a working element, vaporizing the fuel by inducing mechanical vibrations at a selected ultrasonic frequency in the element at right angles to the column of fuel and thereby subjecting the column of fuel to mechanical vibration, matching the impedance of the column of fuel, due at least in part to its height, to the impedance of the element, passing air across the column, and mixing the vaporized fuel with the air to form a fuel-air mixture.

2. A method of vaporizing a fuel, including the steps of positioning a body of such fuel in an enclosed working zone, subjecting such body in the zone to the mechanical vibrations of a working element, matching the impedance of the body, due at least in part to the thickness of the body and the temperature and pressure of the atmosphere surrounding and in the zone, to the impedance of the working element passing a current of air across the column, mixing the fuel with the air to form an air-fuel mixture, and withdrawing the resulting mixture to a point of use.

3. The method of claim 2 characterized by and including the step of subjecting the enclosed working zone to a pressure less than atmospheric.

4. The method of claim 2 characterized by and including the step of maintaining the body of the fuel at a predetermined thickness as the fuel is vaporized by feeding additional fuel into the working zone so that its impedance is continually matched to the impedance of the working element.

5. A method of vaporizing a selected liquid fuel including the steps of subjecting a column of such liquid fuel to mechanical vibration of a vibrating work piece at a preselected frequency in the ultrasonic range, matching the impedance of the column, due at least in part to its height, to the impedance of the work piece to atomize the liquid fuel at an optimum rate, passing a current of air across the column at a selected velocity to withdraw the vaporized liquid, and at the same time, to form an air-fuel mixture, and maintaining the height of the column generally constant, and therefore the impedance constant, by feeding additional liquid fuel to it at a rate related to the selected velocity of the air current.

6. A method of vaporizing a selected fuel including the steps of positioning a column of such fuel in a work zone, adjacent a work piece, inducing mechanical vibrations in the work piece generally at right angles to the column of fuel from an outside source, tuning the frequency from the outside source to the natural frequency of the work piece, subjecting the column of fuel in the working zone to the mechanical vibrations of the work piece matching the impedance of the column of fuel, due at least in part to the height of the column and the temperature and the pressure of the atmosphere surrounding the zone, to the impedance of the work piece by varying the height of the column of fuel to vaporize the fuel, mixing the thus vaporized fuel with air in a predetermined proportion to form a fuel-air mixture, and supplying the mixture to a point of use.

7. A method of vaporizing a fuel by an elongated driver element having a flat side including the steps of supplying the fuel at a predetermined rate to the flat side of the element, simultaneously vibrating the element at selected frequencies resonant to the material frequencies of the element on both its longitudinal and lateral modes, and passing an air current across the element during such vibration to form an air-fuel mixture.

8. The method of claim 7 characterized by and including the step of supplying fuel to the flat side at a rate such that the impedance of the height of fuel maintained on the side of the element will be matched to the natural impedance of the element.

9. A method of vaporizing a selected fuel by an elongated driver element having a flat side including the steps of selecting a length and thickness for the element such that the resonant frequencies of vibration on the longitudinal and lateral modes will be harmonics of each other, supplying fuel to the side surface at a preselected rate, inducing mechanical vibrations into the element at a frequency in the ultrasonic range and resonant to one of its modes to thereby subject the fuel to such vibrations to vaporize the fuel, and, at the same time, drawing the vaporized fuel away from the element with an air current to form a fuel-air mixture.

10. A method of vaporizing a liquid fuel including the steps of defining a limited working zone between a pair of opposed working elements, maintaining a column of liquid in the zone between the elements, vaporizing the fuel by inducing ultrasonic mechanical vibrations in at least one of the elements so that at least one element will function as a driver and the other as an anvil, passing an air current by the elements, and mixing the vaporized fuel with the air current to form a fuel-air mixture.

11. The method of claim 10 in which ultrasonic vibrations are induced in both elements.

12. The method of claim 11 in which the elements vibrate at the same frequency.

References Cited in the file of this patent

UNITED STATES PATENTS

| | | |
|---|---|---|
| 1,559,116 | Marrison | Oct. 27, 1925 |
| 1,939,302 | Heaney | Dec. 12, 1933 |
| 2,453,595 | Rosenthal | Nov. 9, 1948 |
| 2,532,554 | Joeck | Dec. 5, 1950 |
| 2,700,894 | Van Valkenburg | Feb. 1, 1955 |
| 2,711,646 | Mendousse | June 28, 1955 |
| 2,732,835 | Hundt | Jan. 31, 1956 |
| 2,791,994 | Grieb | May 14, 1957 |